United States Patent Office 3,118,500
Patented Jan. 21, 1964

3,118,500
TREATMENT OF UNDERGROUND FORMATIONS TO RENDER THEM LESS PERMEABLE
Jim Maddox, Jr. and Reeves B. Perry, Houston, Tex., assignors to Texaco Inc., a corporation of Delaware
No Drawing. Filed Apr. 13, 1959, Ser. No. 805,718
3 Claims. (Cl. 166—29)

This invention relates to the treatment of permeable underground formations. More particularly, this invention relates to a process for treating permeable underground formations to reduce substantially its porosity and permeability.

There are a number of known procedures for treating permeable underground formations to render them substantially impermeable. One common procedure involves the injection of liquid cement into the permeable formation and then permitting the cement to set therein. This cementing technique renders the formation substantially impermeable to fluids. Another method practiced heretofore has comprised injecting into an underground formation one treating solution followed by a second treating solution and permitting reaction between the thus-introduced treating solutions with the eventual formation and deposition of solid materials which plug the formation. Aother procedure practiced heretofore involves the injection of a treating solution into an underground permeable solution wherein the treating solution reacts with the formation fluids to form and deposit solid materials.

Each of these prior art methods of plugging or reducing permeability of underground formations is characterized by some disadvantage. Cement plugging is sometimes difficult to control particularly when liquid cement has to be injected into relatively tight low permeability formations. The use of two treating solutions to plug a formation has the disadvantage that a skin plugging effect occurs at the interface of the treating solutions within the formation. Further, with two treating solutions it is difficult to obtain the desired intimate mixture necessary to insure satisfactory and complete reactions of the treating solutions within the formation undergoing treatment. The plugging procedure employing a treating solution which reacts with formation fluids has the disadvantage that the composition of the formation fluid is variable and completely beyond the control of the operator.

In a commonly-assigned copending application, Serial No. 700,274, filed December 3, 1957, by C. C. Nathan and R. B. Perry, now Patent No. 2,990,881, there is disclosed a process for rendering an underground formation impermeable by introducing therein an aqueous solution comprising a metal compound, the sulfide of which metal is water-insoluble, and a thioamide which hydrolyzes in situ in the formation to form hydrogen sulfide which reacts with the metal compound to deposit insoluble metal sulfide within the formation. The process of this invention involves an improvement of the process of the copending application in that it eliminates the necessity of employing a thioamide in the treating solution.

We have now discovered that an improved method for treating a permeable underground formation to reduce its porosity and permeability comprises introducing into a formation sulfate-reducing bacteria and an aqueous solution of a metal compound, the sulfide of which metal is water-insoluble, and a compound which ionizes to give a sulfate anion. The sulfate-reducing bacteria converts sulfate ion within the formation to hydrogen sulfide, which reacts with the metal compound dissolved in the treating solution to form a water-insoluble metal sulfide. The water-insoluble metal sulfide formed by reaction of the metal compound with the hydrogen sulfide produced from the sulfate ion by the sulfate-reducing bacteria precipitates in the formation undergoing treatment with a resulting decrease in its porosity and permeability. Advantageously, the metal compound, the sulfide of which metal is water-insoluble, is a metal sulfate so that it is the source of both the metal to be converted to insoluble metal sulfide and of the sulfate ion converted to hydrogen sulfide by the microbiological action of the sulfate-reducing bacteria.

Normally, a single homogeneous solution containing sulfate-reducing bacteria, sulfate anion precursor and metal compound, the sulfide of which metal is water-insoluble, is employed in the practice of the invention. The use of a single homogeneous treating solution permits saturation of the formation undergoing treatment to any desired extent. In addition to the sulfate anion, the metal compound and the sulfate-reducing bacteria, the single homogeneous treating solution contains other inorganic salts normally used as components of a nutrient medium for the growth and proliferation of the sulfate-reducing bacteria.

Another modification of the invention involves separate introduction of an aqueous solution containing the sulfate anion precursor and metal compound convertible to an insoluble sulfide and of an aqueous nutrient medium seeded with the sulfate-reducing bacteria. This modification is not as convenient and effective as the preferred modification involving the introduction of a homogeneous single solution containing the essential components of sulfate anion precursor, metal compound and sulfate-reducing bacteria, but it does not suffer the drawback of prior art dual solution plugging techniques because the microbial process of the invention involves continuous diffuse reactions rather than interfacial reactions.

Metal compounds which are convertible to water-insoluble metal sulfides by interaction with hydrogen sulfide and which are suitable for use in the practice of the invention include the water-soluble compounds of salts of the heavy metals such as lead, mercury, copper, bismuth, cadmium, germanium, silver, iron, nickel, molybdenum, manganese, chromium, vanadium, zinc, arsenic, antimony and mixtures thereof. Particularly useful metal compounds are the sulfates of copper, cadmium, iron, nickel, manganese and zinc which are water-soluble and provide the necessary sulfate anion concentration. Other effective metal compounds are lead acetate, lead chlorate, lead nitrate, lead dithionate, basic lead nitrite, lead perchlorate, lead phosphate, mercuric chlorate, mercuric nitrate, mercurous chloride, ferric chloride, zinc nitrate, sulfur nitrate, antimony nitrate, tin nitrate, nickel nitrate, nickel chloride and the like. All of the afore-mentioned metal compounds react with hydrogen sulfide to form water-insoluble sulfides. The water-insoluble sulfides formed in situ by reaction with hydrogen sulfide liberated from the sulfate anion by microbial action of sulfate-reducing bacteria with the resulting reduction of the porosity of the treated formation include PbS, HgS, $Cu_2S$, CuS, $Bi_2S_3$, CdS, GeS, $As_2S_3$, $SbS_2$, SnS, $Ag_2S$, $FeS_2$, FeS, $Fe_2S_3$, NiS, $MoS_2$, MnS, $MnS_2$, ZnS, CrS, $Cr_2S_3$, $V_2S_3$, and like sulfides.

As indicated previously, the sulfate anion precursor is advantageously a soluble sulfate of a metal whose sulfide is water-insoluble. The preferred sulfate anion precursors are cupric sulfate, cadmium sulfate, ferrous sulfate, nickel sulfate, manganese sulfate, zinc sulfate and the corresponding thiosulfates. Other sulfate anion precursors usable in the process of the invention are sulfates of sodium, potassium, lithium, beryllium, magnesium, zirconium, cobalt, aluminum, ammonium and mixtures thereof. All of the aforementioned sulfates are water-soluble and provide sulfate anion required for the process of this invention.

Ferrous sulfate and ferrous ammonium sulfate are particularly preferred materials since they not only provide the necessary sulfate anion and metal ion for reaction with $H_2S$ but sulfate-reducing bacteria tolerate a much higher concentration of iron than of other metals converitble to insoluble sulfides such as cadmium and copper.

Sulfate-reducing bacteria usable in the process of the invention are anaerobic or obligate type. Effective sulfate-reducing bacteria are various species of the *Desulfovibrio desulfuricans* genus. These bacteria reduce the aforedescribed sulfates and thiosulfates to hydrogen sulfide.

Since most aqueous nutrient media required in the growth and proliferation of sulfate-reducing bacteria contain water-soluble sulfates which ionize to yield sulfate anion, they are a convenient source of the sulfate anion only requiring an increase in the concentration of the sulfate anion precursors. A typical nutrient medium for sulfate-reducing bacteria comprises among other inorganic salts, magnesium sulfate, sodium sulfate, and ferrous ammonium sulfate (Mohr's salt). The ferrous ammonium sulfate provides the metal cation which reacts with hydrogen sulfide to yield an insoluble metal sulfate and the magnesium sulfate, sodium sulfate and ferrous ammonium sulfate provide the necessary sulfate anion which yields hydrogen sulfide by the action of the sulfate-reducing bacteria. The only requirement for such a nutrient is that the ferrous ammonium sulfate be employed in a sufficiently high concentration.

Typical aqueous nutrient media employed to aid in the growth and proliferation of the sulfate-reducing bacteria have the compositions shown hereafter and identified as Nutrients I and II, respectively.

NUTRIENT I

| | | |
|---|---|---|
| $K_2HPO_4$ | g | 0.01 |
| Sodium lactate | g | 2.4 |
| Yeast extract | g | 1.0 |
| Ascorbic acid | g | 0.1 |
| $MgSO_4 \cdot 7H_2O$ | g | 0.2 |
| NaCl | g | 10.0 |
| $Fe(SO_4)_2(NH_4)_2 \cdot 6H_2O$ (Mohr's salt) | g | 0.1 |
| Distilled $H_2O$ | ml | 1000 | pH adjusted to 7.5 with NaOH.

NUTRIENT II

| | | |
|---|---|---|
| $Na_2SO_4$ | g | 1 |
| $CaCl_2 \cdot 2H_2O$ | g | 0.1 |
| Sodium lactate | g | 3.5 |
| Mohr's salt | | Trace |
| $H_2O$ (tap) | ml | 1000 |

If the aqueous inorganic nutrient medium is designed to provide both the metal compound, the sulfide of which is water-insoluble, and the sulfate anion precursor, then the concentration of components is adjusted to provide the desired concentration of metal compound convertible to an inorganic sulfide and a sulfate anion precursor. In such instances, it is also desirable to incorporate sequestering agents to prevent premature deposition of the metal compound in the permeable formation. Examples of well known sequesterants are citric, gluconic and ethylene diamine-tetra-acetic acids and alkali metal salts thereof. The presence of such sequestering agents assures the retention of the metal compound in soluble form until the solution reaches the area of the underground formation whose porosity and permeability are to be decreased by the process of the invention.

A medium selected for growth and proliferation of the sulfate-reducing bacteria and having the desired concentration of the sulfate anion precursor and metal compound, the sulfide of which metal is water-insoluble, is shown hereafter and identified as Nutrient III.

NUTRIENT III

| | | |
|---|---|---|
| Ammonium chloride | g | 1.0 |
| Sodium sulfate | g | 5.0 |
| Sodium chloride | g | 5.0 |
| Magnesium sulfate | g | 0.2 |
| Potassium hydrogen phosphate | g | 0.2 |
| Ferrous ammonium sulfate | g | 5–7.5 |
| Yeast extract | g | 1.0 |
| Sodium citrate | g | 1.5 |
| Sodium lactate | g | 6.0 |
| Sodium thioglycollate | g | 0.1 |
| $H_2O$ | ml | 1000 | pH adjusted from 6.8 to 7.0 with NaOH.

The afore-described nutrient medium contains all the elements necessary for the growth and proliferation of the sulfate-reducing bacteria and in addition contains a sufficiently high concentration of sulfate anion and metal compound to yield sufficient insoluble metal sulfide in situ to plug the pores of a formation.

In general, the aqueous solution contains 0.2 to 5 weight percent concentration of both sulfate ion precursor and of metal compound, the sulfide of which metal is water-insoluble. Preferred concentrations fall in the range of 0.5 to 2 weight percent. Advantageously the sulfate anion precursor is present in the aqueous solution in excess of the amount required to yield hydrogen sulfide necessary for reaction with the metal compound to give insoluble metal sulfide.

The microbial process of the invention in plugging formations is advantageously effected at a temperature between 70 and 120° F. although under certain conditions somewhat higher and lower temperatures between about 50 and 140° F. can be employed.

The following examples illustrate the process of the invention.

*Example 1.*—An Alundum core was placed in a permeameter test cell and saturated with a 5% sodium chloride brine solution. A nutrient medium having the composition set forth previously under the identification "Nutrient III" and containing specifically 5 gms. of ferrous ammonium sulfate per liter was seeded with *Desulfovibrio desulfuricans* and injected into the Alundum core. After a period of time, permeability of the Alundum core was measured and it was observed that the water permeability of the Alundum core was substantially reduced due to the precipitation of ferrous sulfide formed by reaction with the hydrogen sulfide liberated by microbial action from the sulfate anion component of the solution. The deposition of the ferrous sulfide in the Alundum core was noted by the formation of a black column initiating at the injection end of the core which continued to grow for a five-day period. The data observed in carrying out the foregoing experiment are summarized in Table I.

*Table I*

| | |
|---|---|
| Cell length | 22.5 cm. |
| Cell diameter | 3.25 cm. |
| Bulk volume | 185 ml. |
| Pore volume | 47.0 ml. |
| Porosity | 25.4%. |
| Permeability to 5% brine | 190 millidarcys. |
| Composition of treating solution | Nutrient III (5 g./l. ferrus ammonium sulfate) seeded with *Desulfovibrio desulfuricans*. |
| Volume of seeded medium injected | 80 ml. |
| Reaction temperature | 95–100° F. |
| Pore volumes injected | 1.71. |
| Permeability after reaction | 50 millidarcys. |
| Reduction in permeability | 74%. |

*Example 2.*—A sand pack was prepared with white blasting sand in a permeameter cell and after evacuation and saturation with a 5% sodium chloride brine solution was treated with the nutrient medium having the same composition as that employed in Example 1 with the exception that the concentration of the ferrous ammonium sulfate was raised from 5 gms. per liter to 7.5 gms. per liter. Prior to introduction into the sand pack the nutrient was seeded with *Desulfovibrio desulfuricans*. Testing of the thus treated sandpack during a suitable length of time indicated that there was a substantial reduction in water permeability of the treated pack. The data observed in this test are set forth in Table II.

*Table II*

| | |
|---|---|
| Cell length | 37.5 cm. |
| Cell diameter | 3.4 cm. |
| Bulk volume | 312 ml. |
| Pore volume | 124 ml. |
| Porosity | 39.8%. |
| Permeability | 2.35 darcys. |
| Composition of solution injected | Nutrient III (7.5 g./l. ferrous ammonium sulfate) seeded with *Desulfovibrio desulfuricans*. |
| Volume of seeded medium injected | 124 ml. |
| Pore volume injected | 1.0. |
| Reaction time | 120 hrs. |
| Reaction temperature | 95–100° F. |
| Permeability after reaction | 37 millidarcys. |
| Reduction in permeability | 99+%. |

The foregoing examples clearly demonstrate the efficacy of the process of the invention in reducing the porosity and permeability of a formation. One of the major advantages of the process of the invention is that plugging of the formation is effected in situ by microbial action on inorganic salts. The homogeneous solution comprising sulfate reducing bacteria, sulfate anion precursor and metal compound which reacts with hydrogen sulfide to form an insoluble sulfide, is simply and accurately injected into the desired area, for example, a "thief" zone of an underground formation.

Obviously, many modifications and variations of the invention as hereinbefore set forth may be made without departing from the spirit and scope thereof and, therefore, only such limitations should be imposed as are indicated in the appended claims.

I claim:

1. A process for treating a permeable underground formation to render it less permeable which comprises introducing into said formation a homogeneous aqueous solution containing sulfate-reducing bacteria, ferrous ammonium sulfate and a sequesterant selected from the group consisting of citric acid, gluconic acid, ethylene diamine-tetra-acetic acid and alkali metal salts of said acids, retaining said solution in said underground formation for a sufficient period of time for said sulfate-reducing bacteria to form hydrogen sulfide by microbial action on said ferrous ammonium sulfate with the resultant precipitation of ferrous sulfide in situ within said formation.

2. A process according to claim 1 in which said sulfate-reducing bacteria are selected from the genus *Desulfovibrio desulfuricans*.

3. A process according to claim 1 in which said sequesterant is sodium citrate.

References Cited in the file of this patent

UNITED STATES PATENTS

| | | |
|---|---|---|
| 2,156,219 | Dunn | Apr. 25, 1939 |
| 2,837,163 | Ramos et al. | June 3, 1958 |
| 2,912,378 | Bernard | Nov. 10, 1959 |
| 2,990,881 | Nathan et al. | July 4, 1961 |
| 3,004,599 | Goodwin et al. | Oct. 17, 1961 |
| 3,013,607 | Bond et al. | Dec. 19, 1961 |

OTHER REFERENCES

Beerstecher, E., Jr., Petroleum Microbiology, Elsevier Press, Inc., 1954, pages 47 and 253–259 relied on.

Plummer, F. B., "Chemical Treatment for Oil-Field Water for Injection Into the Ground," Oil and Gas Journal, July 28, 1945, pp. 157–158.

"Citric Acid Is New Water-Flooding Aid," Oil and Gas Journal, March 19, 1956, pp. 126–127.